(12) United States Patent
Kokeguchi

(10) Patent No.: US 7,602,543 B2
(45) Date of Patent: Oct. 13, 2009

(54) DISPLAY ELEMENT AND DRIVING METHOD THEREOF

(75) Inventor: Noriyuki Kokeguchi, Kokubunji (JP)

(73) Assignee: Konica Minolta Holdings, Inc. (JP)

( * ) Notice: Subject to any disclaimer, the term of this patent is extended or adjusted under 35 U.S.C. 154(b) by 15 days.

(21) Appl. No.: 11/883,455

(22) PCT Filed: Jan. 12, 2006

(86) PCT No.: PCT/JP2006/300244

§ 371 (c)(1),
(2), (4) Date: Jul. 31, 2007

(87) PCT Pub. No.: WO2006/082697

PCT Pub. Date: Aug. 10, 2006

(65) Prior Publication Data

US 2008/0170288 A1    Jul. 17, 2008

(30) Foreign Application Priority Data

Feb. 4, 2005    (JP) .............................. 2005-028671

(51) Int. Cl.
*G02F 1/153* (2006.01)
*G02F 1/15* (2006.01)
(52) U.S. Cl. ...................................... 359/267; 359/265
(58) Field of Classification Search ................. 359/265, 359/296, 297
See application file for complete search history.

(56) References Cited

U.S. PATENT DOCUMENTS 4,240,716 A    12/1980   Camlibel et al.
7,518,777 B2 *  4/2009   Kokeguchi ................... 359/270
2009/0091234 A1 * 4/2009  Kokeguchi ................... 313/358
2009/0103169 A1 * 4/2009  Kokeguchi ................... 359/296

FOREIGN PATENT DOCUMENTS

| EP | 712025 A2 | * | 5/1996 |
| EP | 1845410 A1 | * | 10/2007 |
| JP | 2003-241227 A | | 8/2003 |
| JP | 2003-337350 A | * | 11/2003 |
| JP | 2004177491 A | | 6/2004 |
| JP | 2004191838 A | | 7/2004 |
| WO | WO 2006/082697 A1 | * | 8/2006 |

OTHER PUBLICATIONS

English-language translation of the Written Opinion of the International Searching Authority (PCT/ISA/237) prepared by the International Bureau of WIPO in connection with International Application PCT/JP2006/300244 (Sep. 11, 2007).*
European Search Report for European Patent Application No. 06702561.9-1228 dated Jan. 13, 2009 with English Translation.

* cited by examiner

*Primary Examiner*—David N Spector
(74) *Attorney, Agent, or Firm*—Cantor Colburn LLP

(57) ABSTRACT

A display element capable of being driven with a low voltage through a simple member arrangement in which the time for switching the screen is shortened. The display element has an electrolytic layer, containing silver or a compound containing silver in the chemical structure, between opposed electrodes, and performs driving operation of the opposed electrodes such that dissolution-deposition of silver takes place. The display element is characterized in that the electrolytic layer substantially contains no iodine ion and at least two pixels having different degree of blackening are subjected to whitening reset driving simultaneously in the driving operation.

6 Claims, 4 Drawing Sheets

DISPLAY ELEMENT AND DRIVING METHOD THEREOF

CROSS REFERENCE TO RELATED APPLICATIONS

This is a U.S. national stage of application No. PCT/JP2006/300244, filed on 12 Jan. 2006. Priority under 35 U.S.C. §119(a) and 35 U.S.C. §365(b) is claimed from Japanese Application No. 2005-028671, filed 4 Feb. 2005, the disclosure of which is also incorporated herein by reference.

TECHNICAL FIELD

The present invention relates to an electrochemical display element utilizing dissolution and deposition of silver and to a method to drive the display element.

BACKGROUND OF THE INVENTION

In recent years, along with the increase in the operating speed of personal computers, the spread of network infrastructure, the markedly increased capacity of data storage, and the decrease in price, a further opportunity is increasing in which information such as text and images which have traditionally been supplied in the form of paper printed matter is now acquired and read as convenient electronic information.

Employed as such electronic information reading means are conventional liquid crystal displays as well as CRTs, and in recent years, emissive displays such as organic EL displays are drawn attention. Particularly, when electronic information is in the form of text, it is necessary for an operator to watch the browsing means for a relatively long period of time, which is not a human-conscious operation. Generally, it is known that emissive displays exhibit the following disadvantages: screen flickering results in eye fatigue; display devices are not portable; reading posture is limited; operators tend to gaze at a still screen; and reading over an extended period of time results in an increase of electric power consumption.

Known as display means to overcome such disadvantages are reflective displays (having a memory function) which do not consume power for maintaining images since these displays use external light. However, due to the following reasons, it is difficult to mention that sufficient performance is achieved.

Namely, displays employing polarized plates such as reflective liquid crystals exhibit reflectance as low as approximately 40 percent, resulting in having a problem in displaying white. Further, the production methods employed to prepare constituting members are not simple. Polymer dispersion type liquid crystal displays require relatively high voltage, in addition, since only the difference in the refractive index among organic materials is utilized, the resulting images do not exhibit sufficient contrast. Polymer network type liquid crystal displays result in problems in which a high voltage is required and in order to enhance memory functions, complicated TFE circuits are required. Display elements based on an electrophoretic method necessitate voltage as high as at least 10 V, and durability problems may occur due to coagulation of electrophoretic particles. Electrochromic display elements can be driven at as low as 3 V, however, color qualities of black and other colors (for example, yellow, magenta, cyan, blue, green, and red) are not sufficient, and in addition, in order to keep the memory function of the display, complicated display constitution may be needed, for example, a constituting layer prepared by an evaporation technique.

Known as a display system which overcomes many of the above mentioned problems is an electrodeposition display (hereinafter referred to as ED) utilizing dissolution and deposition of metals or metal salts. The ED display exhibits advantages such that it is possible to drive the ED system at a voltage below 3 V, the cell structure is simple, the contrast between black and white, as well as the quality of black are excellent. Various methods on ED displays have been disclosed (refer, for example, to Patent Documents 1-3).

The present inventor has examined in detail the prior art disclosed in each of the above Patent Documents and have found that, in the prior art, as well as the blackening operation, a whitening operation depending on the extent of blackening has been necessary for each pixel, even in a whitening operation, resulting in the delay of time necessary for whole screen switching, and thus the present invention was motivated.

(Patent Document 1) U.S. Pat. No. 4,240,716
(Patent Document 2) Japanese Patent Publication No. 3428603
(Patent Document 3) Japanese Patent Application Publication Open to Public Inspection (hereinafter referred to as JP-A) No. 2003-241227

DISCLOSURE OF THE INVENTION

Problems to be Solved by the Invention

The present invention has been made in light of the foregoing circumstances. An object of the present invention is to provide a display element having a simple display construction and exhibiting a low drive voltage, a high display contrast and a shortened screen switching time, and to provide a driving method of the same.

Means to Solve the Problems

The above object of the present invention is achieved by the following structures.

(1) A display element comprising opposed electrodes having therebetween an electrolyte layer comprising silver or a compound comprising silver in the chemical structure, the display element being driven by a driving operation including a whitening/blackening operation so as to whiten or blacken a pixel of the display element by dissolving silver or depositing silver using the opposed electrodes,
  wherein
  the electrolyte layer comprises substantially no iodine; and
  at least two pixels each having a different blackening are simultaneously whitened, instead of whitening each pixel one by one.

(2) The display element of Item (1), wherein the electrolyte layer comprises at least one compound represented by Formula (1) or Formula (2) and at least one compound represented by Formula (3) and Formula (4):

Formula (1)

wherein L represents an oxygen atom or $CH_2$, $R_1$-$R_4$ each represent a hydrogen atom, an alkyl group, an alkenyl group, an aryl group, a cycloalkyl group, an alkoxyalkyl group or an alkoxy group,

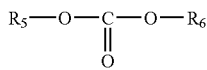  Formula (2)

wherein $R_5$ and $R_6$ each represent a hydrogen atom, an alkyl group, an alkenyl group, an aryl group, a cycloalkyl group, an alkoxyalkyl group or an alkoxy group,

  Formula (3)

wherein $R_7$ and $R_8$ each represent a substituted or unsubstituted hydrocarbon group, provided that, when a ring containing S is formed, no aromatic group is contained,

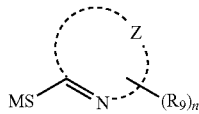  Formula (4)

wherein:

M represents a hydrogen atom, a metal atom or a quarternary ammonium;

Z represents a nitrogen-containing heterocyle;

n represents an integer of 0 to 5;

$R_9$ represents a hydrogen atom, a halogen atom, an alkyl group, an aryl group, an alkylcarbonamide group, an arylcarvonamide group, an alkylsulfonamide group, an acylsulfonamide group, an alkoxy group, an aryloxy group, an alkylthio group, an arylthio group, an alkylcarbamoyl group, an arylcarbamoyl group, a carbamoyl group, an alkylsulfamoyl group, an arylsulfamoyl group, a sulfamoyl group, a cyano group, an alkylsulfonyl group, an arylsulfonyl group, an alkoxycarbonyl group, the aryloxycarbonyl group, an alkylcarbonyl group, an arylcarbonyl group, an acyloxy group, a carboxyl group, a carbonyl group, a sulfonyl group, an amino group, a hydroxy group, or a heterocycle group; and when n is an integer of two or more, each $R_9$ may be the same or different, and each $R_9$ may be combined to form a condensed ring.

(3) The display element of Item (1) or (2), wherein the display element satisfies Condition (1):

$$0 \leq [X]/[Ag] \leq 0.01 \quad \text{Condition (1)}$$

wherein:

[X] (mole/kg) represents a molar content of halogen ions or halogen atoms contained in the electrolyte layer; and

[Ag] (mole/kg) represents a total molar content of silver or silver contained in the compound comprising silver in the chemical structure, comprised in the electrolyte layer.

(4) The display element of any one of Items (1) to (3), wherein the driving operation comprises an operation to deposit blackened silver at a potential higher than an overpotential and an operation to continue depositing the blackened silver at a potential lower than the overpotential.

(5) A method of driving a display element comprising the step of:

whitening simultaneously at least two pixels each having a different blackening, instead of whitening each pixel one by one, the display element comprising opposed electrodes having therebetween an electrolyte layer comprising silver or a compound comprising silver in the chemical structure, the display element being driven by a driving operation including a whitening/blackening operation so as to whiten or blacken a pixel of the display element by dissolving silver or depositing silver using the opposed electrodes, wherein the electrolyte layer comprises substantially no iodine.

(6) A method of driving a display element comprising the step of:

whitening simultaneously at least two pixels each having a different blackening, instead of instead of whitening each pixel one by one, the display element comprising opposed electrodes having therebetween an electrolyte layer comprising silver or a compound comprising silver in the chemical structure, the display element being driven by a driving operation including a whitening/blackening operation so as to whiten or blacken a pixel of the display element by dissolving silver or depositing silver using the opposed electrodes, wherein the electrolyte layer substantially does not comprise iodine; and the electrolyte layer comprises at least one compound represented by Formula (1) or Formula (2) of Item (2) and at least one compound represented by Formula (3) and Formula (4) of Item (2).

(7) The method of Item (5) or (6), wherein the display element satisfies Condition (1):

$$0 \leq [X]/[Ag] \leq 0.01 \quad \text{Condition (1)}$$

wherein:

[X] (mole/kg) represents a molar content of halogen ions or halogen atoms contained in the electrolyte layer; and

[Ag] (mole/kg) represents a total molar content of the silver or silver contained in the compound comprising silver in the chemical structure, contained in the electrolyte layer.

(8) The method of any one of Items (5) to (7), wherein the driving operation comprises an operation to deposit blackened silver at a potential higher than an overpotential and an operation to continue depositing the blackened silver at a potential lower than the overpotential.

EFFECT OF THE INVENTION

According to the present invention, a display element having a simple display construction and exhibiting a low drive voltage, a high display contrast and a shortened screen switching time, as well as a driving method of the same can be obtained.

DESCRIPTION OF ALPHANUMERIC DESIGNATIONS

Figure 1:
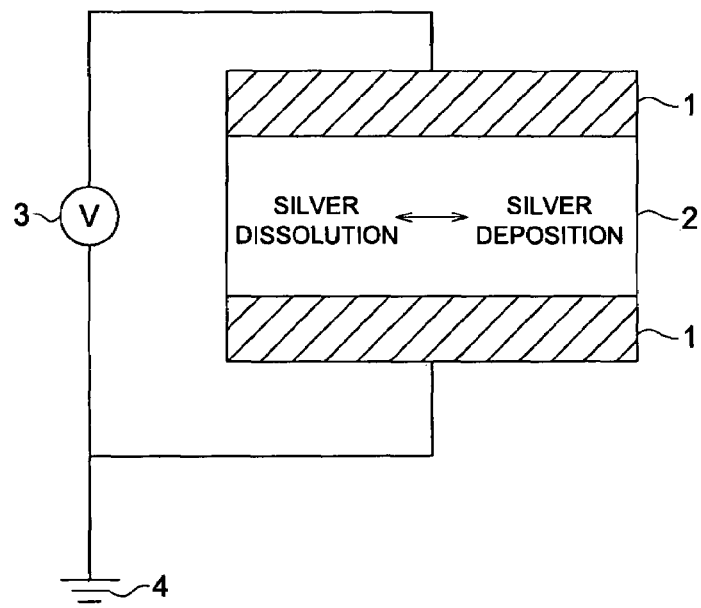
FIG. 1 is a schematic cross-section view illustrating the basic structure of the display element of the present invention.

1. Opposed electrodes
2. Electrolyte layer
3. Power source
4. Earthing

BEST MODES FOR CARRYING OUT THE INVENTION

The best modes of the present invention will be described below.

As a result of extensive studies by the inventor of the present invention, it was found that a display element having a simple display construction and exhibiting a low drive voltage, high display contrast and a shortened screen switching time is achieved by a display element containing opposed electrodes having therebetween an electrolyte layer containing silver or a compound containing silver in the chemical structure, the display element being driven by a driving operation so as to electrochemically dissolve silver or to electrochemically deposit silver using the opposed electrodes, whereby a pixel of the display element is whitened or blackened, wherein the electrolyte layer substantially does not contain iodine; and at least two pixels each having a different extent of blackening are simultaneously whitened, instead of whitening each pixel one by one.

Details of the display element present invention will now be explained.

The display element of the present invention is an ED method display containing opposed electrodes having therebetween an electrolyte layer containing silver or a compound containing silver in the chemical structure, in which the display element is driven by a driving operation so as to dissolve silver or to deposit silver using the opposed electrodes.

So far, as a driving method via an ED method, many examples of driving method to blacken the pixel, namely, to reduce silver, however, as for a driving method to whiten the pixel, namely, to oxidize silver, or to whiten all the pixels of a multi-pixel display element having matrix electrodes to set back to an initial condition (also referred to as resetting to white in the present invention), few examples have been disclosed. As a similar method, a driving method has been disclosed in foregoing Patent Document 3 (JP-A No. 2003-241227). However, in this Patent Document, only disclosed is an example in which each pixel is whitened by applying electricity corresponding to the extent of blackening of each pixel, when the pixels are reset to white. The present inventor has found that, when an excessive voltage is applied to whiten each pixel in the electrolyte composition disclosed in Patent Document 3, yellowish stain is formed in the electrolyte, which is deduced to be originated from the oxidant of iodine contained in the electrolyte. Namely, it is difficult to simultaneously reset all the pixels to white by applying a uniform voltage which is independent to the extent of blackening of each pixel. As a result of the extensive studies by the present inventors under such circumstances, it was found that, even in the ED method, resetting to white is possible, specifically, by use of the electrolyte composition of the present invention, excellent resetting to white is possible.

[Silver or Compound Containing Silver in the Chemical Structure]

The term "silver or a compound containing silver in the chemical structure", according to the present invention, is a general term referring to compounds such as silver oxide, silver sulfide, metallic silver, colloidal silver particles, silver halide, a silver complex compound, or silver ions, and phase states such as a solid state, a dissolved state in a liquid, or a gaseous state, as well as charge states such as a neutral state, an anionic state, or a cationic state are not particularly specified.

[Basic Structure of the Display Element]

FIG. 1 is a schematic cross-sectional view showing the basic structure of the display element of the present invention.

As shown in FIG. 1, the display element of the present invention incorporates electrolyte layer 2 between a pair of opposed electrodes 1. In the display element, the display state is varied utilizing differences in optical properties of the silver-containing compound such as transmission and absorption of light. The optical properties of silver-containing compound is changed by dissolving silver in electrolyte layer 2 or depositing silver from electrolyte layer 2 by applying voltage or current through the opposed electrodes 1 from power source 3.

[Driving Method]

The display element and the driving method of the same of the present invention are characterized in that least two pixels each having a different extent of blackening are simultaneously reset to white.

In the display element of the present invention employing an electrochemical deposition property, when triangular wave voltage is applied between transparent column electrode-row electrode, an electric current-voltage transient response property is observed. If voltage is increased from zero to minus side between transparent column electrode-row electrode, silver does not deposit for a while and then begins to deposit on the column electrode when the voltage exceeds the threshold potential for deposition.

Deposition of silver continues when the voltage moves beyond the peak of the triangular wave voltage and decreases again, even to a voltage lower than the threshold potential for deposition. The deposition of silver stops when the voltage decreases as low as the threshold potential for dissolution. Alternatively, when a voltage of reverse polarity (positive) is applied between column electrode-row electrode, dissolution of silver begins and disappears when the voltage reaches the maximum voltage for dissolution. To drive a display element having the abovementioned electric current-voltage transient response characteristic, the simplest method is to apply a voltage which exceeds the deposition threshold potential in address driving to deposit silver and write the pixel. However, this method may cause unevenness in concentration of writing or prolonged address time, whereby the screen switching time is increased.

Figure 2:
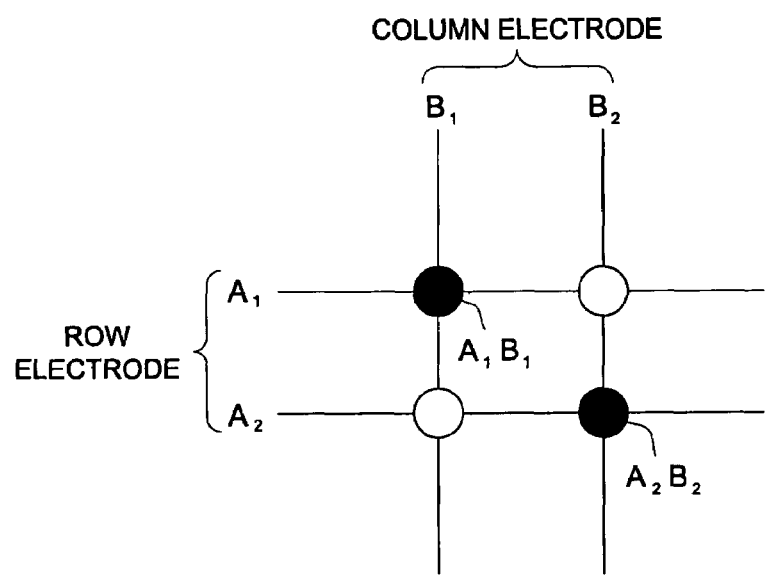
FIG. 2 is a schematic diagram illustrating an example of a monochromatic display having 2×2 pixels.

In the present invention, it is also possible to add a data sustaining pulse immediately after a data-address period, by which the amount of deposited silver is controlled independently to the address pulse. Hereafter, for simplification of explanation, a monochrome display having 2×2 pixels as shown in FIG. 2 is used for an example to explain the wave pattern of driving voltage.

Figure 3:
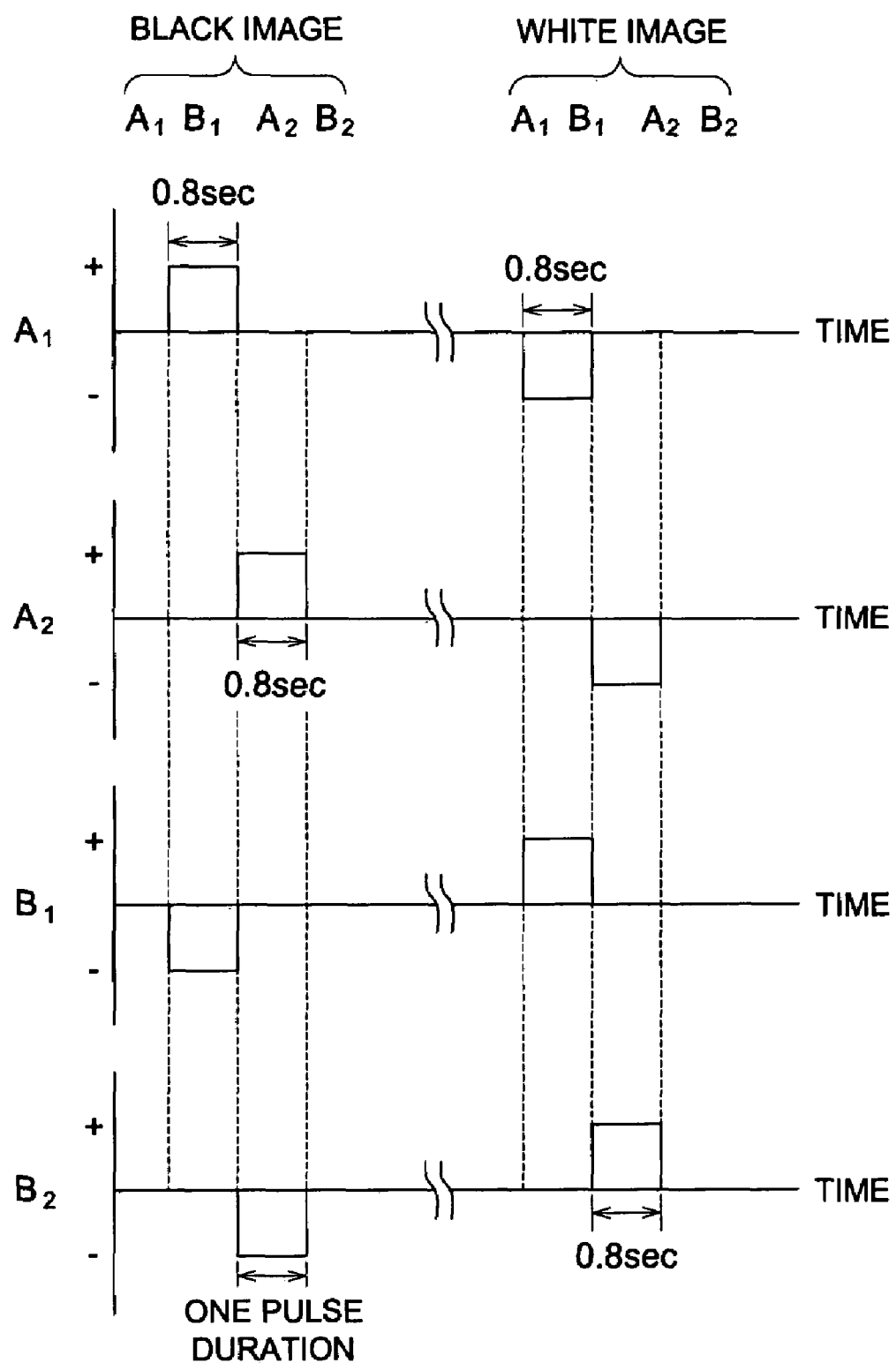
FIG. 3 illustrates an example of a wave pattern of driving voltage to display or whitening a pixel according to the conventional method.

In FIG. 3, an example of a wave pattern of driving voltage to display or erase a pixel according to the conventional method in such a display element in which a negative voltage is applied to a column electrode, and when the voltage becomes larger than the deposition threshold potential, deposition of silver occurs on the column electrode, while, when a positive voltage is applied to the column electrode, the deposited silver is dissolved.

FIG. 3 shows row voltages applied to the row electrodes $A_1$, $A_2$ and column voltages applied to the column electrodes $B_1$, $B_2$.

When display is performed, a scanning voltage which is smaller than the deposition threshold potential is applied to each of the row electrodes $A_1$, $A_2$ and an address pulse voltage for signal writing, which is smaller than the deposition threshold potential, is applied to each of the column electrode $B_1$, $B_2$. The selection operation is carried out sequentially from the top. A larger voltage than deposition threshold potential is applied only to the pixel to have silver deposition, thus, silver is deposited on the column electrode to form silver nuclei.

For example, in pixel ($A_1$, $B_1$), the address pulse voltage applied to the column electrode $B_1$ and the address pulse voltage applied to the row electrode $A_1$ are added to apply a voltage larger than the deposition threshold potential to the pixel. As the result, silver is deposited and thus black display is carried out. On the other hand, for example in the pixel ($A_1$, $B_2$), there is no period when the address pulse voltage of the column electrode and the address pulse voltage of the row electrode is added, and only a voltage lower than the deposition threshold potential is applied to the pixel. Therefore, since no deposition of silver occurs, it serves as a white display.

It is also possible to apply a data sustaining pulse voltage to the row electrodes $A_1$, $A_2$, . . . , in the data sustaining period after the data address period. The amount of deposited silver can be controlled by applying the data sustaining pulse voltage to uniformize the density of each pixel. When a data sustaining pulse voltage is applied, deposition of silver is continued only in the pixel to which a voltage larger than the deposition threshold potential has been applied, and in the pixel to which no such high voltage larger than the deposition threshold potential has been applied, no deposition of silver occurs even when the data sustaining pulse voltage Vsus is applied, and no-deposition state is maintained.

Conversion of the black display of the image ($A_1$, $B_1$) to a white display is carried out by reversing the polarity of each of the address pulse voltage of the column electrode and the address pulse voltage of the row electrode, whereby deposited silver is dissolved again to give a white display. However, in the conventional driving method as shown in the voltage pattern illustrated in FIG. 3, conversion of the black display to the white display, namely a whitening operation, has been carried out independently in each black display pixel in a similar manner as the blackening operation. Accordingly, there has been a problem that a longer time has been needed to convert a black display to a white display, namely, since application of voltage necessary to convert a black display to a white display corresponding to the voltage applied in the blackening operation has been carried out in each pixel, a longer time has been needed to complete the whitening operation of all the pixels.

In view of the abovementioned problem, the display element and its driving method of the present invention is characterized in that at least two pixels each having a different extent of blackening are simultaneously reset to white.

Figure 4:
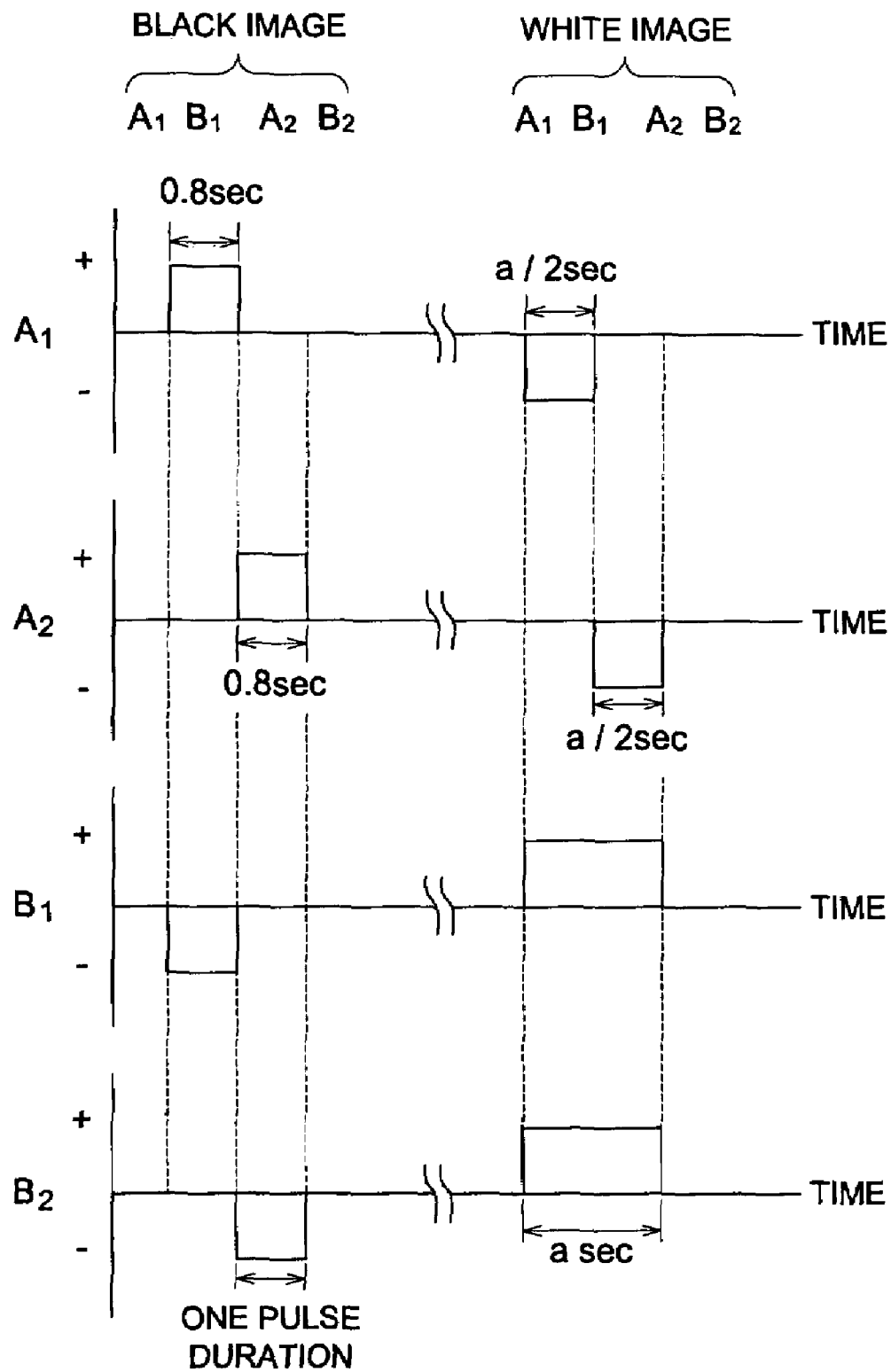
FIG. 4 illustrates an example of a wave pattern of driving voltage applied to the driving method of the display element of the present invention.

FIG. 4 illustrates an example of a wave pattern of driving voltage used for the driving method of the display element of the present invention.

In the method illustrated in FIG. 4, after performing a blackening operation in the same manner as shown in FIG. 3, conversion to white display (resetting to white) is carried out by scanning the row electrodes ($A_1$, $A_2$), but, not by selectively scanning the column electrodes. The whitening operation is carried by applying an address pulse voltage (positive voltage) necessary to whitening uniformly to all the column electrodes. As the result, the driving time is shortened, since no selective scanning is carried out, and also because electric current is supplied to the neighboring pixels.

Figure 5:
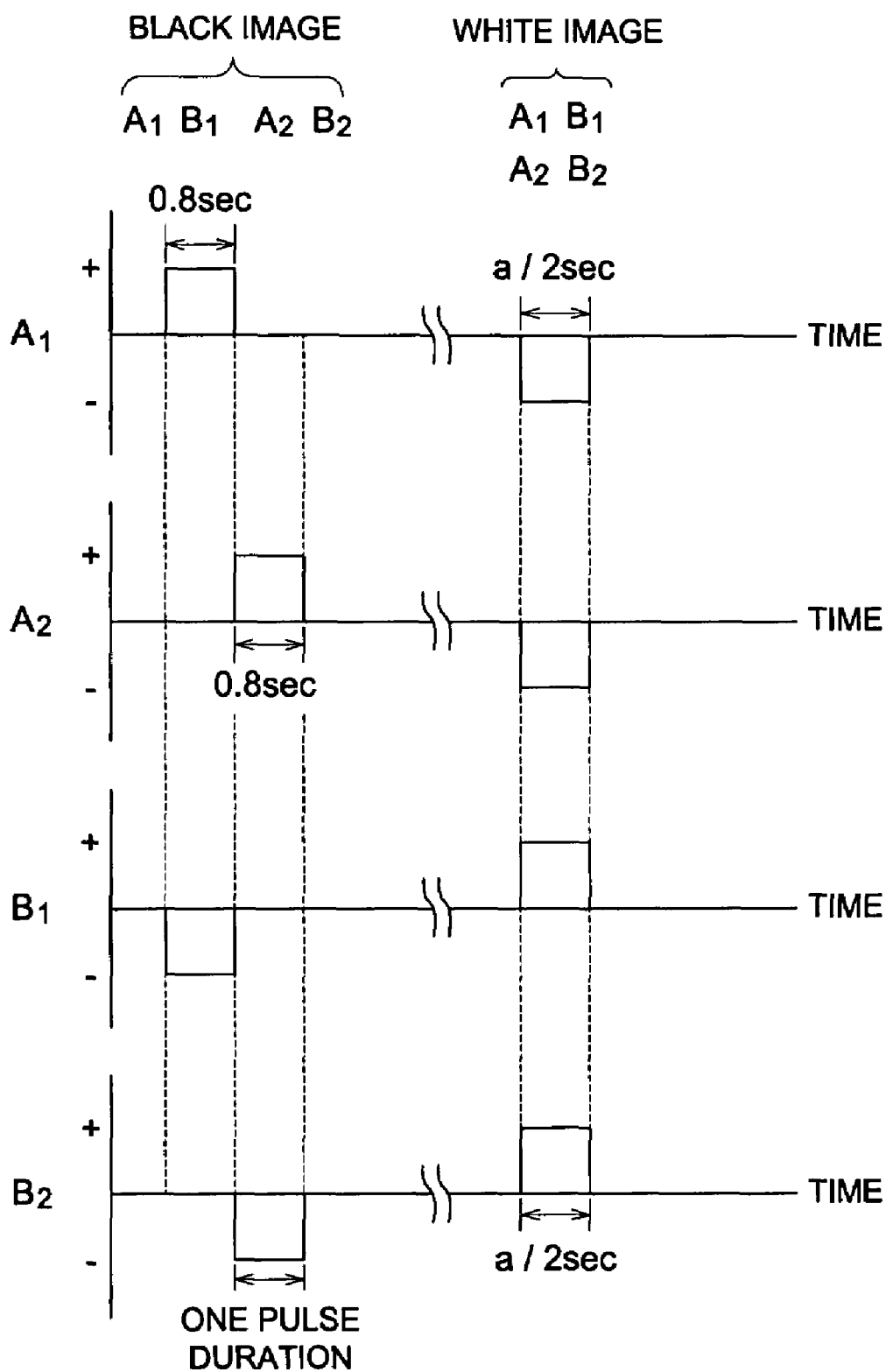
FIG. 5 illustrates an example of a wave pattern of driving voltage applied to the driving method of the display element of the present invention.

FIG. 5 illustrates another example of a wave pattern of driving voltage used for the driving method of the display element of the present invention.

In the method illustrated in FIG. 4, after performing a blackening operation in the same manner as shown in FIG. 3, conversion to white display (resetting to white) is carried out by applying a negative address pulse voltage to all the row electrodes ($A_1$, $A_2$) and applying a positive address pulse voltage to all the column electrodes ($B_1$, $B_2$), without scanning the row electrodes ($A_1$, $A_2$) and the column electrodes ($B_1$, $B_2$). As the result, the driving time is shortened, since no selective scanning of each of the row electrodes ($A_1$, $A_2$) and the column electrodes ($B_1$, $B_2$) is carried out, and also because electric current is supplied to the neighboring pixels.

In the display element and driving method of the same of the present invention, the electrolyte layer preferably contains at least one compound represented by above mentioned Formula (1) or Formula (2) and at least one compound represented by above mentioned Formula (3) and Formula (4)

The compound represented by Formula (1) will be explained, first.

In the above mentioned Formula (1), L represents an oxygen atom or $CH_2$, and $R_1$-$R_4$ each represent a hydrogen atom, an alkyl group, an alkenyl group, an aryl group, a cycloalkyl group, an alkoxy alkyl group or an alkoxy group.

Examples of an alkyl group include: a methyl group, an ethyl group, a propyl group, an isopropyl group, a tert-butyl group, a pentyl group, a hexyl group, an octyl group, a dodecyl group, a tridecyl group, a tetradecyl group and a pentadecyl group; examples of an aryl group include: a phenyl group and a naphthyl group; examples of a cycloalkyl group include: a cyclopentyl group and a cyclohexyl group; examples of an alkoxyalkyl group include: β-methoxyethyl group and γ-methoxypropyl group; and examples of an alkoxy group include: a methoxy group, an ethoxy group, a propyloxy group, a pentyloxy group, a hexyloxy group, an octyloxy group and a dodecyloxy group.

Specific examples of a compound represented by Formula (1) of the present invention will be shown below, however, the present invention is not limited thereto.

The compounds represented by Formula (1) are commercially available, for example, propylene carbonate produced by Showa Denko K. K. and propylene carbonate produced by Kanto Chemical Co., Inc. Also, these compounds can be synthesized according to the method given in AIST Today, 2003, 05 Vol. 3-5.

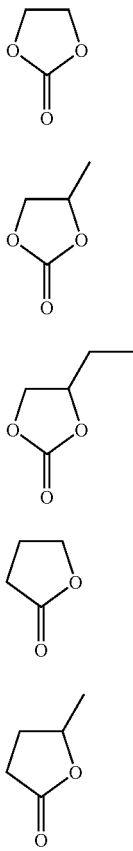

1-1

1-2

1-3

1-4

1-5

Subsequently, the compound represented by Formula (2) of the present invention will be explained.

In abovementioned Formula (2), $R_5$, $R_6$ each represent a hydrogen atom, an alkyl group, an alkenyl group, an aryl group, a cycloalkyl group, an alkoxyalkyl group or an alkoxy group.

Examples of an alkyl group include: a methyl group, an ethyl group, a propyl group, an isopropyl group, a tert-butyl group, a pentyl group, a hexyl group, an octyl group, a dodecyl group, a tridecyl group, a tetradecyl group and a pentadecyl group; examples of an aryl group include: a phenyl group and a naphthyl group; examples of a cycloalkyl group include: a cyclopentyl group and a cyclohexyl group; examples of an alkoxyalkyl group include: β-methoxyethyl group and γ-methoxypropyl group; and examples of an alkoxy group include: a methoxy group, an ethoxy group, a propyloxy group, a pentyloxy group, a hexyloxy group, an octyloxy group and a dodecyloxy group.

Specific examples of a compound represented by Formula (2) of the present invention will be shown below, however, the present invention is not limited thereto.

The compounds represented by Formula (2) are commercially available, for example, ethylene carbonate produced by Maruzen Petrochemical Co., Ltd. and ethylene carbonate produced by Kanto Chemical Co., Inc. Also, these compounds can be synthesized according to the method given in AIST Today, 2003, 05 Vol. 3-5.

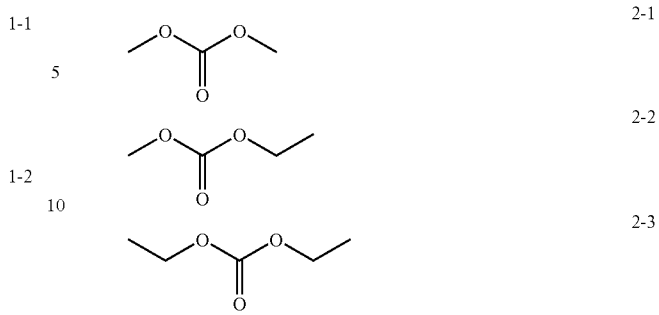

2-1

2-2

2-3

Among the compounds represented by Formula (1) and Formula (2), exemplified compounds (1-1), (1-2) and (2-3) are specifically preferable.

The compounds represented by Formula (1) and Formula (2) of the present invention belong to one sort of an electrolyte solvent. In the display element of the present invention, another solvent can be used in combination, provided that the object effect of the present invention is not lost. Examples of such a solvent include: tetramethylurea, sulfolane, dimethyl sulfoxide, 1,3-dimethyl-2-imidazolidinone, 2-(N-methyl)-2-pyrrolidinone, hexamethylphosphortriamide, N-methyl propione amide, N,N-dimethylacetamide, N-methylacetamide, N,N-dimethylformamide, N-methylformamide, butyronitrile, propionitrile, acetonitrile, acetylacetone, 4-methyl-2-pentanone, 2-butanol, 1-butanol, 2-propanol, 1-propanol, ethanol, methanol, acetic anhydride, ethylacetate, ethylpropionate, dimethoxyethane, diethoxyfuran, tetrahydrofuran, ethylene glycol, diethylene glycol, triethylene glycol monobutyl ether and water.

It is preferable that, among these solvents, at least one solvent having a freezing point of −20° C. or lower and a boiling point of 120° C. or more is incorporated.

Further, listed as solvent employable in the present invention are the compounds shown in: J. A. Riddick, W. B. Bunger, T. K Sakano, "Organic Solvents", 4th. ed., John Wiley & Sons (1986), Y. Marcus, "Ion Solvation", John Wiley & Sons (1985), C. Reichardt, "Solvents and Solvent Effects in Chemistry", 2nd ed., VCH (1988) and G. J. Janz, R. P. T. Tomkins, "Nonaqueous Electrolytes' Handbook", Vol. 1, Academic Press (1972).

In the present invention, the electrolyte solvent may be a single kind or may be a mixture, however, a mixed solvent containing ethylene carbonate is preferable. The added amount of ethylene carbonate is preferably 10 mass % or more but 90 mass % or less. A mixed electrolyte solvent having a propylene carbonate/ethylene carbonate mass ratio of 7/3 to 3/7 is specifically preferable. When the propylene carbonate mass ratio is larger than 7/3, ionic conductivity of the electrolyte may become lower, resulting in decrease of response rate, while when it is smaller than 3/7, deposition of electrolyte tends to occur at a lower temperature.

In the present invention, it is preferable to use a compound represented by abovementioned Formula (3) together with a compound represented by abovementioned Formula (1) or Formula (2).

In abovementioned Formula (3), $R_7$ and $R_8$ each represent a substituted or unsubstituted hydrocarbon group, which may contain a normal chain group or a branched chain group of an aromatic compound. Also, the hydrocarbon group may contain one or more nitrogen atoms, oxygen atoms, phosphorus atoms, sulfur atoms, or halogen atoms, provided that, when a ring containing S atom is formed, no aromatic group is contained.

Examples of a substituent of the hydrocarbon group include an amino group, a guanidino group, a quarternary ammonium group, a hydroxyl group, a halogen compound, a carboxylic acid group, a carboxylate group, an amide group, a sulfinic acid group, a sulfonic acid group, a sulfate group, a phosphonic acid group, a phosphate group, a nitro group and a cyano group.

Generally, in order to carry out dissolution-deposition of silver, it is necessary to solubilize silver in the electrolyte layer. For example, it is common to use a method by which silver or a compound containing silver is converted to a soluble compound, by coexisting silver or a compound containing silver with a compound having a chemical structure which can interact with silver, for example, to form a coordinate bond with silver or to form a weak covalent bond with silver. Known examples of such a chemical structure include: a halogen atom, a mercapto group, a carboxyl group and an imino group. In the present invention, a thioether group is also useful and works as a silver resolvent having less influence to the coexisting compounds and a high solubility to the solvent.

Specific examples of a compound represented by Formula (3) of the present invention will be shown below, however, the present invention is not limited thereto.

The compounds represented by Formula (3) are commercially available, for example, 3-thia-1,5-pentanediol produced by Kanto Chemical Co., Inc. Also, these compounds can be synthesized according to the method given in U.S. Pat. No. 4,126,459 or JP-A No. 2003-267899.

3-1: $CH_3SCH_2CH_2OH$ 3-2: $HOCH_2CH_2SCH_2CH_2OH$ 3-3: $HOCH_2CH_2SCH_2CH_2SCH_2CH_2OH$ 3-4: $HOCH_2CH_2SCH_2CH_2SCH_2CH_2SCH_2CH_2OH$ 3-5: $HOCH_2CH_2SCH_2CH_2OCH_2CH_2OCH_2CH_2SCH_2CH_2OH$ 3-6: $HOCH_2CH_2OCH_2CH_2SCH_2CH_2SCH_2CH_2OCH_2CH_2OH$ 3-7: $H_3CSCH_2CH_2COOH$ 3-8: $HOOCCH_2SCH_2COOH$ 3-9: $HOOCCH_2CH_2SCH_2CH_2COOH$ 3-10: $HOOCCH_2SCH_2CH_2SCH_2COOH$ 3-11: $HOOCCH_2SCH_2CH_2SCH_2CH_2SCH_2CH_2SCH_2COOH$ 3-12: $HOOCCH_2SCH_2CH_2SCH_2CH(OH)CH_2SCH_2CH_2SCH_2CH_2COOH$ 3-13: $HOOCCH_2CH_2SCH_2CH_2SCH_2CH(OH)CH(OH)CH_2SCH_2CH_2SCH_2CH_2COOH$ 3-14: $H_3CSCH_2CH_2CH_2NH_2$ 3-15: $H_2NCH_2CH_2SCH_2CH_2NH_2$ 3-16: $H_2NCH_2CH_2SCH_2CH_2SCH_2CH_2NH_2$ 3-17: $H_3CSCH_2CH_2CH(NH_2)COOH$ 3-18: $H_2NCH_2CH_2OCH_2CH_2SCH_2CH_2SCH_2CH_2OCH_2CH_2NH_2$ 3-19: $H_2NCH_2CH_2SCH_2CH_2OCH_2CH_2OCH_2CH_2SCH_2CH_2NH_2$ 3-20: $H_2NCH_2CH_2SCH_2CH_2SCH_2CH_2SCH_2CH_2SCH_2CH_2NH_2$ 3-21: $HOOC(NH_2)CHCH_2CH_2SCH_2CH_2SCH_2CH_2CH(NH_2)COOH$ 3-22: $HOOC(NH_2)CHCH_2SCH_2CH_2OCH_2CH_2OCH_2CH_2SCH_2CH(NH_2)COOH$ 3-23: $HOOC(NH_2)CHCH_2OCH_2CH_2SCH_2CH_2SCH_2CH_2OCH_2CH(NH_2)COOH$ 3-24: $H_2N(=O)CCH_2SCH_2CH_2OCH_2CH_2OCH_2CH_2SCH_2C(=O)NH_2$ 3-25: $H_2N(O=)CCH_2SCH_2CH_2SCH_2C(O=)NH_2$ 3-26: $H_2NHN(O=)CCH_2SCH_2CH_2SCH_2C(=O)NHNH_2$ 3-27: $H_3C(O=)NHCH_2CH_2SCH_2CH_2SCH_2CH_2NHC(O=)CH_3$ 3-28: $H_2NO_2SCH_2CH_2SCH_2CH_2SCH_2CH_2SO2NH_2$ 3-29: $NaO_3SCH_2CH_2CH_2SCH_2CH_2SCH_2CH_2CH_2SO_3Na$ 3-30: $H_3CSO_2NHCH_2CH_2SCH_2CH_2SCH_2CH_2NHO_2SCH_3$ 3-31: $H_2—N(NH)CSCH_2CH_2SC(NH)NH_2 \cdot 2HBr$ 3-32: $H_2(NH)CSCH_2CH_2OCH_2CH_2OCH_2CH_2SC(NH)NH_2 \cdot 2HCl$ 3-33: $H_2N(NH)CNHCH_2CH_2SCH_2CH_2SCH_2CH_2NHC(NH)NH_2 \cdot 2HBr$ 3-34: $[(CH_3)_3NCH_2CH_2SCH_2CH_2SCH_2CH_2N(CH_3)_3]^{2+} \cdot 2Cl^-$

3-35

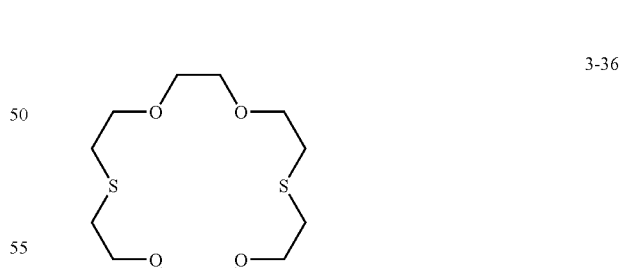

3-36

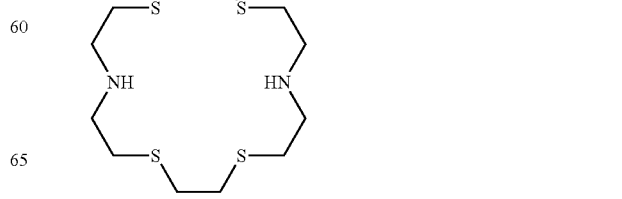

3-37

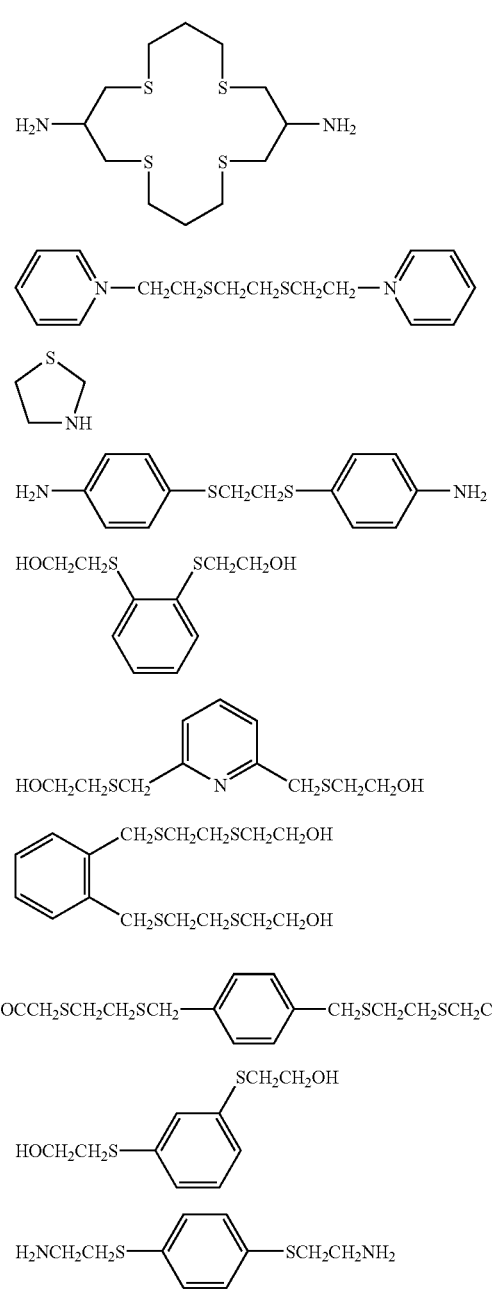

Among the above exemplified compounds, exemplified compound (3-2) is specifically preferable to fully achieve the effect of the present invention.

Next, the compound represented by Formula (4) of the present invention will be explained.

In Formula (4), M represents a hydrogen atom, a metal atom or quarternary ammonium; Z represents a nitrogen-containing heterocycle, provided that Z is not an imidazole ring; n represents an integer of 0 to 5; $R_9$ represents a hydrogen atom, a halogen atom, an alkyl group, an aryl group, an alkylcarbonamide group, an arylcarbonamide group, an alkylsulfonamide group, an arylsulfonamide group, an alkoxy group, an aryloxy group, an alkylthio group, an arylthio group, an alkylcarbamoyl group, an arylcarbamoyl group, a carbamoyl group, an alkylsulfamoyl group, an arylsulfamoyl group, a sulfamoyl group, a cyano group, an alkylsulfonyl group, an arylsulfonyl group, an alkoxycarbonyl group, an aryloxycarbonyl group, an alkylcarbonyl group, an arylcarbonyl group, an acyloxy group, a carboxyl group, a carbonyl group, a sulfonyl group, an amino group, an hydroxy group, or a heterocyclic group; and when n is an integer of two or more, each $R_9$ may be the same or different, and each $R_9$ may be combined to form a condensed ring.

Examples of a metal atom represented by M include Li, Na, K, Mg, Ca, Zn and Ag. Examples of a quarternary ammonium include $NH_4$, $N(CH_3)_4$, $N(C_4H_9)_4$, $N(CH_3)_3Cl_2H_{25}$, $N(CH_3)_3C_{16}H_{33}$, and $N(CH_3)_3CH_2C_6H_5$.

Examples of a nitrogen-containing heterocyclic ring represented by Z in Formula (4) include a tetrazole ring, a triazole ring, an oxidiazole ring, a thiadiazole ring, an indole ring, an oxazole ring, a benzoxazole ring, a benzothiazole ring, a benzoselenazole ring and a naphthoxazole ring.

In Formula (4), $R_9$ represents one of the atoms or groups listed below:

examples of a halogen atom include a fluorine atom, a chlorine atom, a bromine atom and an iodine atom;

examples of an alkyl group include a methyl group, an ethyl group, a propyl group, an i-propyl group, a butyl group, a t-butyl group, a pentyl group, a cyclopentyl group, a hexyl group, a cyclohexyl group, an octyl group, a dodecyl group, a hydroxyethyl group, a methoxyethyl group, a trifluoromethyl group, and a benzyl group;

examples of an aryl group include a phenyl group, and a naphthyl group;

examples of an alkylcarbonamide group include an acetylamino group, a propionylamino and a butyrylamino group;

examples of an arylcarbonamide group include an benzoylamino group;

examples of an alkylsulfonamide group include a methanesulfonylamino group and an ethanesulfonylamino group;

examples of an arylsulfonamide group include a benzenesulfonylamino group and a toluenesulfonylamino group;

examples of an arylsulfonamide group include a benzenesulfonylamino group and a toluenesulfonylamino group;

examples of an aryloxy group include a phenoxy group;

examples of an alkylthio group include a methylthio group, an ethylthio group and a butylthio group;

examples of an aryltion group include a phenylthio group and a tolylthio group;

examples of an alkylcarbamoyl group include a methylcarbamoyl group, a dimethylcarbamoyl group, an ethylcarbamoyl group, a diethylcarbamoyl group, a dibutylcarbamoyl group, a piperidylcarbamoyl group, and a morpholylcarbamoyl group;

examples of an arylcarbamoyl group include a phenylcarbamoyl group, a methylphenylcarbamoyl group, an ethylphenylcarbamoyl group and a benzylphenylcarbamoyl group;

examples of an alkylsulfamoyl group include a methylsulfamoyl group, a dimethylsulfamoyl group, an ethylsulfamoyl group, a diethylsulfamoyl group, a dibutylsulfamoyl group, a piperidylsulfamoyl group, and a morpholylsulfamoyl group;

examples of an arylsulfamoyl group include a phenylsulfamoyl group, a methylphenylsulfamoyl group, an ethylphenylsulfamoyl group, and a benzylphenylsulfamoyl group;

examples of an alkylsulfonyl group include a methanesulfonyl group and an ethanesulfonyl group;

examples of an arylsulfonyl group include a phenylsulfonyl group, a 4-chlorophenylsulfonyl group and a p-toluenesulfonyl group;

examples of an alkoxycarbonyl group include a methoxycarbonyl group, an ethoxycarbonyl group and a butoxycarbonyl group;

examples of an aryloxycarbonyl group include a phenoxy carbonyl group;

examples of an alkylcarbonyl group include an acetyl group, a propionyl group and a butyroyl group;

examples of an arylcarbonyl group include a benzoyl group and an alkylbenzyl group;

examples of an acyloxy group include an acetyloxy group, a propionyloxy group and a butyryloxy group;

examples of an heterocyclic group include an oxazole ring, a thiazole ring, a triazole ring, a selenazole ring, a tetrazol ring, an oxadiazole ring, a thiadiazole ring, a thiazin ring, a triazine ring, a benzoxazole ring, a benzthiazole ring, a benzimidazole ring, the indolenine ring, a benzoselenazole ring, the naphthothiazole ring, a triazaindolizine ring, a diazaindolizine ring and a tetraazaindolizine ring. These substituents may further have a substituent.

Specific examples of a compound represented by Formula (4) will be shown below, however, the present invention is not limited thereto.

The compounds represented by Formula (4) are commercially available, for example, 2-mercaptobenzoxazole produced by Tokyo Chemical Industry Co. Also, these compounds can be synthesized according to the method disclosed in JP-A No. 1-4739 or 3-10172.

4-1
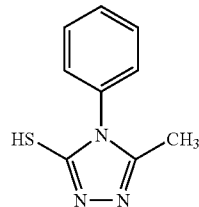

4-2
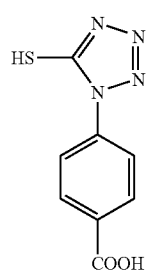

4-3
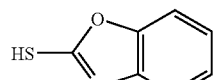

4-4
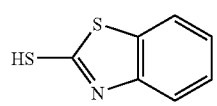

4-5
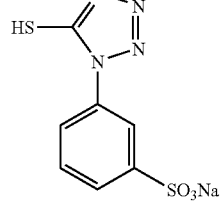

-continued 4-6
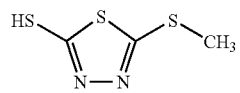

4-7
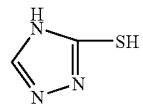

4-8
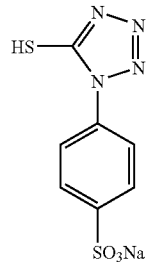

4-9

4-10

4-11

4-12

4-13

-continued

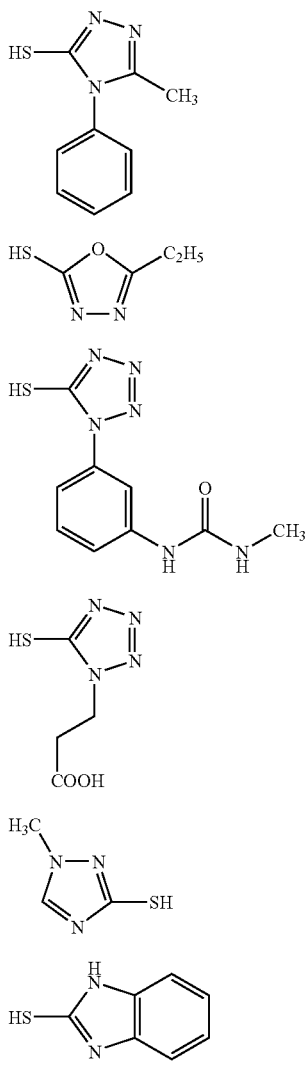

4-14

4-15

4-16

4-17

4-18

4-19

Among the above exemplified compounds, exemplified compounds (4-12) and (4-18) are specifically preferable to fully achieve the effect of the present invention.

In the display element and its driving method of the present invention, when a molar content of halogen ions or halogen atoms contained in the electrolyte layer of the display element is represented as [X] (mole/kg) and a total molar content of silver or silver contained in the compound having silver in the chemical structure is represented as [Ag] (mole/kg), it is preferable that following Condition (1) is satisfied:

$$0 \leq [X]/[Ag] \leq 0.01$$  Condition (1)

In the present invention, "a halogen atom" means an iodine atom, a chlorine atom, a bromine atom or a fluorine atom.

When the [X]/[Ag] value is larger than 0.01, the reaction of $X^- \rightarrow X_2$ tends to occur while silver is oxidized-reduced. $X_2$ easily dissolves blackened silver by cross-oxidizing the blackened silver, which is one of the factors degrading memory function of the display. Accordingly, the molar content of halogen is preferably as low as possible against the molar content of silver. In the present invention, more preferable is $0 \leq [X]/[Ag] \leq 0.001$. When halogen ions are added, with respect to improving a memory function, the total molar content of each halogen species preferably satisfies [I]<[Br]<[Cl]<[F].

Of these, the present invention is characterized in that the electrolyte layer contains substantially no iodine.

The expression "substantially no iodine" means, in the present invention, that, when a molar content of iodine ions or iodine atoms contained in the electrolyte layer of the display element is represented as [I] (mole/kg) and a total molar content of silver or silver contained in the compound having silver in the chemical structure is represented as [Ag] (mole/kg), it is preferable that following Condition (2) is satisfied:

$$0 \leq [X]/[Ag] \leq 0.001$$  Condition (1)

By controlling the amount of iodine in the above condition, the yellowish stain due to the oxidized iodine contained in the electrolyte layer can be avoided, even when an excessive voltage is applied to each pixel to whiten the pixel.

(Electrolyte-Silver Salt)

In the display element of the present invention, silver salts known in the art can be used. Examples of such silver salts include: silver iodide, silver chloride, silver bromide, silver oxide, silver sulfide, silver citrate, silver acetate, silver behenate, a silver salt of p-toluenesulfonic acid, a silver salt of mercapto compound and a silver complex with an iminodiacetic acid. Of these, preferable is a silver salt which does not contain a nitrogen atom having coordinating property with halogen, carboxylic acid or silver, for example, a silver salt of p-toluenesulfonic acid is preferable.

The content of silver ions in the electrolyte layer of the present invention is preferably 0.2 mole/kg$\leq$[Ag]$\leq$2.0 mole/kg. When the content of silver ions is smaller than 0.2 mole/kg, the silver solution becomes too diluted and the driving rate is reduced, while, when the content of silver ions is larger than 2 mole/kg, the solubility becomes too low, and precipitation tends to occur while stored at a lower temperature, which is disadvantageous.

(Electrolyte Materials)

In the display element of the present invention, when electrolytes are in liquid form, it is possible to incorporate, in the electrolytes, the following compounds. Listed as potassium compounds are KCl, KI, and KBr; listed as lithium compounds are $LiBF_4$, $LiClO_4$, $LiPF_6$, and $LiCF_3SO_3$; while listed as tetraalkylammonium compounds are tetraethylammonium perchlorate, tetrabutylammonium perchlorate, tetraethylammonium borofluoride, tetrabutylammonium borofluoride, and tetrabutylammonium halide. In addition, preferably used are fused salt electrolyte compositions described in paragraphs [0062]-[0081] of JP-A No. 2003-187881. Further employed are compounds which form oxidation-reduction pairs such as $I^-/I_3^-$, $Br^-/Br_3^-$ and quinone/hydroquinone.

Further, when electrolytes are in solid form, it is possible to incorporate, in the electrolytes, the following compounds which exhibit electronic or ionic conductivity.

Listed are fluorinated vinyl based polymers containing perfluorosulfonic acid; polythiophene; polyaniline; polypyrrole, triphenylamines; polyvinylcarbazoles; polymethylphenylsilanes; chalcogenides such as $Cu_2S$, $Ag_2S$, $Cu_2Se$, or $AgCrSe_2$; fluorine compounds such as $CaF_2$, $PbF_2$, $SrF_2$, $LaF_3$, $TlSn_2F_5$, or $CeF_3$; lithium salts such as $Li_2SO_4$ or $Li_4SiO_4$; as well as compounds such as $ZrO_2$, CaO, $Cd_2O_3$, $HfO_2$, $Y_2O_3$, $Nb_2O_5$, $WO_3$, $Bi_2O_3$, AgBr, AgI, CuCl, CuBr, CuBr, CuI, LiI, LiBr, LiCl, $LiAlCl_4$, $LiAlF_4$, AgSBr, $C_5H_5NHAg_5I_6$, $Rb_4Cu_{16}I_7Cl_{13}$, $Rb_3Cu_7Cl_{10}$, LiN, $Li_5NI_2$, or $Li_6NBr_3$.

Further employed as supporting electrolytes may be electrolytes in gel form. When electrolytes are nonaqueous, it is possible to employ oil gelling agents described in paragraphs [0057]-[0059] of JP-A No. 11-185836.

(White Particles Added to the Electrolyte Layer)

In the display element of the present invention, it is preferable that the electrolyte layer incorporates white particles.

Examples of white particles include: titanium dioxide (an anatase type or a rutile type), barium sulfate, calcium carbonate, aluminum oxide, zinc oxide, magnesium oxide, zinc hydroxide, magnesium hydroxide, magnesium phosphate, magnesium hydrogenphosphate, alkaline earth metal salts, talc, kaolin, zeolite, acid clay, glass, as well as organic compounds such as polyethylene, polystyrene, acryl resins, ionomers, ethylene-vinyl acetate copolymer resins, benzoguanamine resins, urea-formalin resins, melamine-formalin resins, or polyamide resins. These particle may be used alone or in combination. Also, the particles may contain voids to alter the refractive index.

Of these, preferably employed are titanium dioxide, zinc oxide, and zinc hydroxide. Also employable are titanium dioxide which has been subjected to a surface treatment employing inorganic oxides (for example, $Al_2O_3$, AlO(OH), and $SiO_2$). In addition to such surface treatments, titanium dioxide particles may be subjected to a treatment employing organic compounds such as trimethylolethane, triethanolamine acetic acid salts or trimethylcyclosilane.

Of these white particle materials, titanium oxide or zinc oxide are preferably used in order to prevent coloring at a higher temperature or with respect to the reflectance of the display element which is influenced by the refractive index.

(Thickening Agents Added to the Electrolyte Layer)

In the display element of the present invention, it is possible to use thickening agents in the electrolyte layer.

Examples include gelatin, gum Arabic, poly(vinyl alcohol), hydroxyethyl cellulose, hydroxypropyl cellulose, cellulose acetate, cellulose acetate butyrate, poly(vinylpyrrolidone), poly(alkylene glycol), casein, starch, poly(acrylic acid), poly(methylmethacrylic acid), poly(vinyl chloride), poly(methacrylic acid), copoly(styrene-maleic anhydride), copoly(styrene-acrylonitrile), copoly(styrene-butadiene), poly(vinyl acetals) (for example, poly(vinyl formal), poly(vinyl butyral)), poly(vinyl esters), poly(urethanes), phenoxy resins, poly(vinylidene chloride), poly(epoxides), poly(carbonates), poly(vinyl acetate), cellulose esters, poly(amides), as well as polyvinyl butyral, cellulose acetate, cellulose acetate butyrate, polyester, polycarbonate, polyacrylic acid, and polyurethane as a transparent hydrophobic binder.

These thickening agents may be employed in combinations of at least two types. Further listed are the compounds described on pages 71-75 of JP-A No. 64-13546. Of these, in view of compatibility with various types of additives and enhancement of dispersion stability of white particles, preferably employed compounds are polyvinyl alcohols, polyvinylpyrrolidones, hydroxypropyl celluloses, and polyalkylene glycols.

(Other Additives to the Electrolyte Layer)

In the display element of the present invention, listed as constitution layers include ancillary layers such as a protective layer, a filter layer, an antihalation layer, a cross-over light cutting layer, or a backing layer. If required, incorporated in these ancillary layers may be various chemical sensitizers, noble metal sensitizers, photosensitive dyes, supersensitizers, couplers, high boiling point solvents, antifoggants, stabilizers, development inhibitors, bleach accelerators, fixing accelerators, color mixing inhibitors, formalin scavengers, toners, hardeners, surface active agents, thickening agents, plasticizers, lubricants, UV absorbers, antirradiation dyes, filter light absorbing dyes, mildewcides, polymer latexes, heavy metals, antistatic agents, and matting agents.

The additives listed above are more detailed in Research Disclosure (hereinafter referred to as RD) Volume 176 Item/17643 (December 1978), RD Volume 184 Item/18431 (August 1979), DR Volume 187 Item/18716 (November 1979), and RD Volume 308 Item/308119 (December 1989).

Types of compounds and their citations in these three Research Disclosures are listed below.

| Additives | RD 17643 | | RD 18716 | | RD 308119 | |
|---|---|---|---|---|---|---|
| | Page | Section | Page | Section | Page | Section |
| Chemical Sensitizers | 23 | III | 648 | right top | 96 | III |
| Sensitizing Dyes | 23 | IV | 648-649 | | 996-8 | IV |
| Desensitizing Dyes | 23 | IV | | | 998 | IV |
| Dyes | 25-26 | VIII | 649-650 | | 1003 | VIII |
| Development Accelerators | 29 | XXI | 648 | right top | | |
| Antifoggant Stabilizer | 24 | IV | 649 | right top | 1006-7 | VI |
| Optical Brightening Agents | 24 | V | | | 998 | V |
| Hardeners | 26 | X | 651 | left | 1004-5 | X |
| Surfactants | 26-7 | XI | 650 | right | 1005-6 | XI |
| Antistatic Agents | 27 | XII | 650 | right | 1006-7 | XIII |
| Plasticizers | 27 | XII | 650 | right | 1006 | XII |
| Lubricants | 27 | XII | | | | |
| Matting Agents | 28 | XVI | 650 | right | 1008-9 | XVI |
| Binders | 26 | XXII | | | 1003-4 | IX |
| Supports | 28 | XVII | | | 1009 | XVII |

(Layer Configuration)

The layer configuration between the opposed electrodes related to the display element of the present invention will now be described in more detail.

As the layer configuration related to the display element of the present invention, it is possible to arrange a constituting layer containing positive hole transport materials. Examples of positive hole transport materials include aromatic amines, triphenylene derivatives, oligochiophene compounds, polypyrroles, polyacetylene derivatives, polyphenylene vinylene derivatives, polythienylene vinylene derivatives, polythiophene derivatives, polyaniline derivatives, polytoluidine derivatives, CuI, CUSCN, $CuInSe_2$, $Cu(In,Ga)Se$, $CuGaSe_2$, $Cu_2O$, CuS, $CuGaS_2$, $CuInS_2$, $CuAlSe_2$, GaP, NiO, CoO, FeO, $Bi_2O_3$, $MoO_2$, and $Cr_2O_3$.

(Substrates)

Examples of a support employable in the display element of the present invention include: polyolefins such as polyethylene or polypropylene, polycarbonates, cellulose acetate, polyethylene terephthalate, polyethylene dinaphthalene dicarboxylate, polystyrene naphthanates, polyvinyl chloride, polyimide, polyvinyl acetals, and polystyrene. In addition, preferred are syndioctatic structured polystyrenes. These are prepared employing the methods described, for example, in each of JP-A Nos. 62-117708, 1-46912, and 1-178505. Further listed examples include metal substrates including stainless steel, paper supports such as baryta paper or resin coated paper, supports including the above plastic film having thereon a reflection layer, and those which are described in JP-A No. 62-253195 (pages 29-31) as a support. Further preferably employed are those described on page 28 of RD No. 17643, from the right column to the left column on page 648 of RD No. 18716, and on page 879 of RD No. 307105. As described in U.S. Pat. No. 4,142,735, these supports may be subjected to a thermal treatment at a temperature lower than Tg so that core-set curl is decreased. Further, the surface of these supports may be subjected to a surface treatment with the aim of enhancement of adhesion of the support to other constituting layers. In the present invention, employed as surface treatments may be a glow discharge treatment, an ultraviolet radiation irradiation treatment, a corona treatment and a flame treatment. Further employed may be supports described on pages 44-149 of Kochi Gijutsu (Prior Art Technology) No. 5 (published by AZTEC Corp., dated Mar. 22, 1991). Further listed are those described on page 1009 of RD No. 308119, as well as in the item "Supports" on page 108 of Product Licensing Index Volume 92. Other than the above, employed may be glass substrates as well as epoxy resins kneaded with glass powder.

(Electrodes)

In the display element of the present invention, it is preferable that at least one of the opposed electrodes is a metal electrode. Employed as metal electrodes may be metals such as platinum, gold, silver, copper, aluminum, zinc, nickel, titanium, or bismuth, as well as alloys thereof, which are known in the art. Preferred metals employed in the metal electrodes are those which exhibit a work function near the oxidation-reduction potential of silver in electrolytes. Of these, a silver electrode or an electrode composed of silver in an amount of at least 80 percent is advantageous to maintain a reduced state of silver, and in addition, results in anti-staining of electrodes. Employed as methods for preparing electrodes may be conventional ones such as a evaporating method, a printing method, an ink-jet method, a spin coating method, or a CVD method.

Further, it is preferable that in the display element of the present invention, at least one of the opposed electrodes is a transparent electrode. Transparent electrodes are not particularly limited as long as they are transparent and electrically conductive. Examples include indium tin oxide (ITO), indium zinc oxide (IZO), tin oxide, fluorine-containing tin oxide (FTO), indium oxide, zinc oxide, platinum, gold, silver rhodium, copper, chromium, carbon, aluminum, silicon, amorphous silicon, and BSO (bismuth silicon oxide). In order to form electrodes as described above, for example, an ITO layer may be subjected to mask evaporation on a substrate employing a sputtering method, or after forming an ITO layer on the entire surface, patterning may be performed employing a photolithographic method. The surface resistance value is preferably 100 Ω/sq or less, but is more preferably 10 Ω/sq or less. The thickness of the transparent electrodes is not particularly limited but is commonly 0.1-20 μm.

(Other Components Constituting the Display Element)

If desired, employed in the display element of the present invention may be sealing agents, column-structured materials, and spacer particles.

Sealing agents are those to seal materials so that they do not leak out. Employed as sealing agents may be heat curing, light curing, moisture curing, and anaerobic curing type resins such as epoxy resins, urethane resins, acryl resins, vinyl acetate resins, enethiol resins, silicone resins, or modified polymer resins.

Column-structured materials provides strong self-supporting (strength) between substrates. For example, listed may be a cylindrical form, a quadrangular form, an elliptic cylindrical form, and a trapezoidal form which are arranged at definite intervals in a specified pattern such as a lattice. Further, employed may be stripe-shaped ones arranged at definite intervals. It is preferable that the column-structured materials are not randomly arranged but arranged at an equal distance, arranged so that the interval gradually varies, or a predetermined pattern is repeated at a definite cycle so that the distance between substrates is appropriately maintained and image display is not hindered. When the column-structured materials are such that the ratio of the area occupied by the display region of a display element is 1-40 percent, sufficient strength for commercial viability is obtained as a display element.

In order to maintain a uniform gap between paired substrates, provided may be spacers between them. As such spacers, exemplified may be spheres composed of resins or inorganic oxides. Further, suitably employed are adhesion spacers the surface of which is coated with thermoplastic resins. In order to maintain the uniform gap between substrates, provided may only be column-structured materials. However, both spacers and column-structure materials may be provided. In place of the column-structured materials, only spacers may be employed as a space-maintaining member. The diameter of spacers, when a column-structured material is formed, is at most its height, but is preferably equal to the height. When the column-structured material is not formed, the diameter of spacers corresponds to the distance of the cell gap.

(Screen Printing)

In the present invention, it is possible to form sealing agents, column-structured materials, and electrode patterns, employing a screen printing method. In screen printing methods, a screen on which predetermined patterns are formed is covered on the electrode surface, and printing materials (compositions to form column-structured materials such as light-curing resins) are placed on the screen. Subsequently a squeegee is moved at predetermined pressure, angle and rate. By such action, the printing materials are transferred onto the above substrate via the pattern of the screen. Then, the transferred materials are thermally cured and dried. When column-structured materials are formed employing the screen printing method, resinous materials are not limited to light-curing resins, but also employed, for example, may be heat curable resins such as epoxy resins or acryl resins, as well as thermoplastic resins. Listed as thermoplastic resins are polyvinyl chloride resins, polyvinylidene chloride resins, polyvinyl acetate resins, polymethacrylic acid ester resins, polyacrylic acid ester resins, polystyrene resins, polyamide resins, polyethylene resins, polypropylene resins, fluorocarbon resins, polyurethane resins, polyacrylonitrile resins, polyvinyl ether resins, polyvinylketone resins, polyether resins, polyvinylpyrrolidone resins, saturated polyester resins, polycarbonate resins, and chlorinated polyether resins. It is preferable that resinous materials are employed in the form of a paste while dissolved in suitable solvents.

As noted above, after forming the column-structured materials on the substrate, spacers are provided on at least one side of the substrate, and paired substrates are placed so that the electrode forming surfaces face each other, whereby a vacant cell is formed. By heating the paired facing substrates, they are allowed to adhere to each other under application of pressure from both sides, whereby a display cell is obtained.

Preparation of a display element may be performed by injecting an electrolyte composition between the substrates, employing a vacuum injection method. Alternatively, during adhesion of substrates, an electrolyte composition may be dripped on the surface of one of the substrates and then liquid crystal composition may be sealed simultaneously when the substrates are allowed to adhere to each other.

(Driving Method of Display Element)

In the blackening process of a pixel of the display element of the present invention, the preferable driving operation include depositing blackened silver by applying a voltage larger than the deposition overpotential potential to the pixel, followed by continuing the deposition of blackened silver by applying a voltage lower than the deposition overpotential potential to the pixel. By conducting the above driving operation, the writing energy and the load to the driving circuit can be reduced, and the writing rate can be increased. Generally, in the field of electrochemistry, it is well known that there exists an overpotential in the electrode reaction. For example, a detailed description on the overpotential is found page 121 of "Denshi-ido no kagaku—Denkikagaku Nyuumon" (1996, Asakura Publishing Co., Ltd.). In the display element of the present invention, the between the electrode and silver contained in the electrolyte is considered to be an electrochemical reaction, and it is easily understood that an overpotential exists when the dissolution and deposition of silver are carried out. The extent of an overpotential depends on the exchange current density. Accordingly, it can be deduced that the surface of blackened silver has less excess electrical energy and injection of electrons is more easily carried out, because deposition of blackened silver can be continued at a lower applying voltage than the deposition overpotential of silver.

The driving operation of the display element of the present invention may be via a simple matrix drive or an active matrix drive. "Simple matrix drive", as described in the present invention, refers to the driving method in which a plurality of positive electrode lines and a plurality of negative electrode lines are placed face to face so that the positive electrode lines and the negative electrode lines cross in right angles, and electric current is sequentially applied to these positive electrode lines and negative electrode lines. By employing the simple matrix driving, it is possible to simplify the circuit structure and the driving IC, resulting in advantages such as lower production cost. Active matrix drive refers to a system in which scanning lines, data lines, and current feeding lines are formed in a checkered pattern and driving is performed by TFT circuits arranged in each of the squares of the checkered pattern. Since switching is performed for each pixel, advantages result in gradation as well as memory function. For example, a circuit disclosed in FIG. 5 of JP-A No. 2004-29327 is usable.

(Fields in which the Display Element of the Present Invention is Applied)

It is possible to apply the display element of the present invention to electronic book related field, ID card related fields, public information related fields, transportation related fields, broadcasting related fields, account settling fields, and distribution and logistics related fields. Specific examples include door keys, student identification cards, corporate member identification cards, various club membership cards, convenience store cards, department store cards, vending machine cards, gas station cards, subway and railroad cards, bus cards, cash cards, credit cards, highway cards, driver licenses, hospital medical examination cards, health insurance cards, residents' basic registers, passports and electronic books.

EXAMPLES

The present invention will now be described with reference to examples, but is not limited thereto. In the following examples, "parts" or "%" mean "mass parts" and "mass %", respectively, unless otherwise specified.

<<Preparation of Display Element>>

[Preparation of Display Element 1]

(Preparation of Electrolyte Liquid 1)

Added to 2.5 g of dimethyl sulfoxide were 90 mg of sodium iodide and 75 mg of silver iodide, which were completely dissolved. Thereafter, 0.5 g of titanium oxide was added and subsequently dispersed, employing an ultrasonic homogenizer. Added to the resulting dispersion was 150 mg of polyvinyl alcohol (polymerization degree of 4500 and saponification degree of 87-89%) and the resulting mixture was stirred for one hour while heated at 120° C., whereby Electrolyte liquid 1 was obtained.

(Preparation of Transparent Electrode)

Lines of an ITO film of 4 mm width with 1 mm interval were formed on a 1.5 mm thick 2 cm×4 cm glass substrate according to the method known in the prior art, whereby a transparent electrode (Electrode 1) was obtained.

(Preparation of Metal Electrode)

Silver paste ink (produced by TOYOBO Co., Ltd.) was screen printed with a thickness of 10 μm so as to form lines of 4 mm width with 1 mm interval on a 1.5 mm thick 2 cm×4 cm glass substrate and heated for 30 minutes in a vacuum oven at 150° C., whereby a silver electrode (Electrode 2) was obtained.

(Preparation of Display Element)

Ten % by volume of spherical glass beads of an average diameter of 40 μm were mixed with Electrolyte liquid 1 followed by agitating. The mixture was applied onto Electrode 2, and subsequently, Electrode 1 was placed on it, and then pressed at a pressure of 9.8 kPa. The peripheral of the display element was sealed by an olefin sealant, whereby Display Element 1 having 2×2 pixels was prepared.

(Preparation of Display Elements 2-7)

(Preparation of Electrolyte Liquid)

(Preparation of Electrolyte Liquid 2)

In 2.5 g of propylene carbonate/ethylene carbonate (mass ratios 7/3), 100 mg of silver p-toluenesulfonate, 150 mg of 3,6-dithia-1,8-octanediol and 1 mg of mercaptotriazole were added and fully dissolved. Thereafter, 0.5 g of titanium oxide (mean primary particle diameter of 30 nm) was added and subsequently dispersed, employing an ultrasonic homogenizer. Added to the resulting dispersion was 150 mg of polyvinyl alcohol (polymerization degree of 4500 and saponification degree of 87-89%) and the resulting mixture was stirred for one hour while heated at 120° C., whereby Electrolyte liquid 2 was obtained.

(Preparation of Electrolyte Liquid 3)

Electrolyte liquid 3 was prepared in the same manner as Electrolyte liquid 2, except that dimethylsulfoxide was used instead of propylene carbonate/ethylene carbonate.

(Preparation of Electrolyte Liquid 4)

Electrolyte liquid 4 was prepared in the same manner as Electrolyte liquid 3, except that 3,6-dithia-1,8-octanediol was not used and 300 mg of mercaptotriazole was used.

(Preparation of Electrolyte Liquid 5)

Electrolyte liquid 5 was prepared in the same manner as Electrolyte liquid 3, except that mercaptotriazole was not used.

(Preparation of Electrolyte Liquid 6)

Electrolyte liquid 6 was prepared in the same manner as Electrolyte liquid 2, except that silver bromide was used instead of silver p-toluenesulfonate.

(Preparation of Electrolyte Liquid 7)

Electrolyte liquid 7 was prepared in the same manner as Electrolyte liquid 2, except that silver chloride was used instead of silver p-toluenesulfonate.

(Preparation of Display Element)

Display Elements 2-7 were prepared in the same manner as Display Element 1, except that Electrolyte liquids 2-7 were used instead of Electrolyte liquid 1.

<<Evaluation of Display Element>>

(Driving Method)

Using a well known passive matrix driving circuit, dissolution-deposition reaction of silver in the electrolyte was carried out with an electricity of 5 mC/cm$^2$ per pixel to switch white display (dissolution state of silver) and black display (deposit state of silver).

(Evaluation)

Evaluation of whole display reset property was carried out according to the following method:

Reflectance W1 which is a reflectance of white display at 550 nm was determined using a spectrophotometer CM-3700d produced by Konica Minolta Sensing Inc., while no voltage was applied. Subsequently, as shown in FIG. 2, the display element was driven via a passive matrix drive, so that the reflectance at 550 nm of pixels $A_1B_1$ and $A_2B_2$ became 10% (black display) and pixels $A_1B_2$ and $A_2B_1$ were remained white. Next, according to the driving methods shown in FIGS. 3-5, a voltage of −2.0 V was applied between row electrodes ($A_1$, $A_2$) and column electrodes ($B_1$, $B_2$) simultaneously to each pixel, and reflectance W2 at 550 nm after the reset was measured. Then, the reflectance ratio W2/W1 was determined. When this value is closer to 1, each pixel is uniformly reset to white display, meaning the whole display reset property is preferable.

When the result obtained by the driving method shown in FIG. 3 was ignored because the pulse applying time for whitening was 0.8 s which was short, it was confirmed that all the display elements 1-7 attained the reflection ratio W2/W1 of almost 1.0 within 1.6 s.

Next, using the driving methods shown in FIGS. 4 and 5 and changing the 1 pulse applying time as shown in Table 1, reflection ratios W2/W1 were measured. The results were listed in Table 1.

TABLE 1

| Display element | Driving method | Case 1 Whole whitening time (s) | Case 1 Reflectance ratio W2/W1 | Case 2 Whole whitening time (s) | Case 2 Reflectance ratio W2/W1 | Remarks |
|---|---|---|---|---|---|---|
| 1 | FIG. 4 | 1.00 | 0.62 | 1.60 | 0.56 | Comp. |
| 1 | FIG. 5 | 0.50 | 0.78 | 0.80 | 0.71 | Comp. |
| 2 | FIG. 4 | 1.00 | 0.98 | 1.05 | 1.00 | Inv. |
| 2 | FIG. 5 | 0.50 | 0.99 | 0.55 | 1.01 | Inv. |
| 3 | FIG. 4 | 1.00 | 0.91 | 1.25 | 0.99 | Inv. |
| 3 | FIG. 5 | 0.50 | 0.92 | 0.65 | 1.01 | Inv. |
| 4 | FIG. 4 | 1.00 | 0.87 | 1.30 | 0.99 | Inv. |
| 4 | FIG. 5 | 0.50 | 0.89 | 0.70 | 1.00 | Inv. |
| 5 | FIG. 4 | 1.00 | 0.92 | 1.15 | 1.00 | Inv. |
| 5 | FIG. 5 | 0.50 | 0.94 | 0.60 | 1.01 | Inv. |
| 6 | FIG. 4 | 1.00 | 0.86 | 1.35 | 0.98 | Inv. |
| 6 | FIG. 5 | 0.50 | 0.85 | 0.75 | 1.01 | Inv. |
| 7 | FIG. 4 | 1.00 | 0.87 | 1.35 | 1.00 | Inv. |
| 7 | FIG. 5 | 0.50 | 0.85 | 0.75 | 0.99 | Inv. |

Inv.: Inventive example, Comp. Comparative example

As shown in Table 1, Display Element 1 which is a comparative example did not give a W2/W1 value close to 1.0 due to the effect of the yellowish stain. On the other hand, it was found that, in each of Display Elements 2-7 of the present invention, whitening of the pixels was completed with 1 pulse applying time of shorter than 1.6 when the driving method prescribed in the present invention was used. Accordingly, it was confirmed that the display elements of the present invention having the construction prescribed by the present invention have superior whole display resetting property to white display compared to the comparative display elements.

What is claimed is:

1. A display element comprising opposed electrodes having therebetween an electrolyte layer comprising silver or a compound comprising silver in the chemical structure, the display element being driven by a driving operation including a whitening/blackening operation so as to whiten or blacken a pixel of the display element by dissolving silver or depositing silver using the opposed electrodes, wherein the electrolyte layer comprises substantially no iodine;

at least two pixels each having a different blackening are simultaneously whitened, instead of whitening each pixel one by one; and the electrolyte layer comprises at least one compound represented by Formula (1) or Formula (2) and at least one compound represented by Formula (3) or Formula (4):

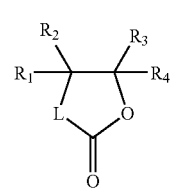

Formula (1)

wherein L represents an oxygen atom or $CH_2$, $R_1$-$R_4$ each represent a hydrogen atom, an alkyl group, an alkenyl group, an aryl group, a cycloalkyl group, an alkoxyalkyl group or an alkoxy group,

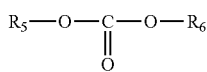

Formula (2)

wherein $R_5$ and $R_6$ each represent a hydrogen atom, an alkyl group, an alkenyl group, an aryl group, a cycloalkyl group, an alkoxyalkyl group or an alkoxy group,

Formula (3)

wherein $R_7$ and $R_8$ each represent a substituted or unsubstituted hydrocarbon group, provided that $R_7$ and $R_8$ may be combined to form a ring, and, when a ring containing S is formed, no aromatic group is contained,

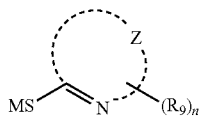

Formula (4)

wherein:
M represents a hydrogen atom, a metal atom or a quarternary ammonium;
Z represents a nitrogen-containing heterocyle;
n represents an integer of 0 to 5;
$R_9$ represents a hydrogen atom, a halogen atom, an alkyl group, an aryl group, an alkylcarbonamide group, an arylcarbonamide group, an alkylsulfonamide group, an arylsulfonamide group, an alkoxy group, an aryloxy group, an alkylthio group, an arylthio group, an alkylcarbamoyl group, an arylcarbamoyl group, a carbamoyl group, an alkylsulfamoyl group, an arylsulfamoyl group, a sulfamoyl group, a cyano group, an alkylsulfonyl group, an arylsulfonyl group, an alkoxycarbonyl group, the aryloxycarbonyl group, an alkylcarbonyl group, an arylcarbonyl group, an acyloxy group, a carboxyl group, a carbonyl group, a sulfonyl group, an amino group, a hydroxy group, or a heterocycle group; and when n is an integer of two or more, each $R_9$ may be the same or different, and each $R_9$ may be combined to form a condensed ring.

2. The display element of claim 1, wherein the display element satisfies Condition (1):

$$0 \leq [X]/[Ag] \leq 0.01$$  Condition (1)

wherein:
[X] (mole/kg) represents a molar content of halogen ions or halogen atoms contained in the electrolyte layer; and
[Ag] (mole/kg) represents a total molar content of silver or silver contained in the compound comprising silver in the chemical structure, comprised in the electrolyte layer.

3. The display element of claim 1, wherein the driving operation comprises an operation to deposit blackened silver at a potential higher than an overpotential and an operation to continue depositing the blackened silver at a potential lower than the overpotential.

4. A method of driving a display element comprising:
whitening simultaneously at least two pixels each having a different blackening, instead of whitening each pixel one by one, the display element comprising opposed electrodes having therebetween an electrolyte layer comprising silver or a compound comprising silver in the chemical structure, the display element being driven by a driving operation including a whitening/blackening operation so as to whiten or blacken a pixel of the display element by dissolving silver or depositing silver using the opposed electrodes, wherein the electrolyte layer substantially does not comprise iodine; and the electrolyte layer comprises at least one compound represented by Formula (1) or Formula (2) and at least one compound represented by Formula (3) and Formula (4):

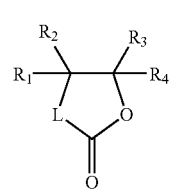

Formula (1)

wherein L represents an oxygen atom or $CH_2$, $R_1$-$R_4$ each represent a hydrogen atom, an alkyl group, an alkenyl group, an aryl group, a cycloalkyl group, an alkoxyalkyl group or an alkoxy group,

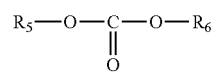

Formula (2)

wherein $R_5$ and $R_6$ each represent a hydrogen atom, an alkyl group, an alkenyl group, an aryl group, a cycloalkyl group, an alkoxyalkyl group or an alkoxy group,

Formula (3)

wherein $R_7$ and $R_8$ each represent a substituted or unsubstituted hydrocarbon group, provided that $R_7$ and $R_8$ may be combined to form a ring, and, when a ring containing S is formed, no aromatic group is contained,

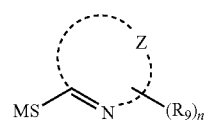

Formula (4)

wherein:
M represents a hydrogen atom, a metal atom or a quarternary ammonium;
Z represents a nitrogen-containing heterocyle;
n represents an integer of 0 to 5;
$R_9$ represents a hydrogen atom, a halogen atom, an alkyl group, an aryl group, an alkylcarbonamide group, an arylcarbonamide group, an alkylsulfonamide group, an arylsulfonamide group, an alkoxy group, an aryloxy group, an alkylthio group, an arylthio group, an alkylcarbamoyl group, an arylcarbamoyl group, a carbamoyl group, an alkylsulfamoyl group, an arylsulfamoyl group, a sulfamoyl group, a cyano group, an alkylsulfonyl group, an arylsulfonyl group, an alkoxycarbonyl group, the aryloxycarbonyl group, an alkylcarbonyl group, an arylcarbonyl group, an acyloxy group, a carboxyl group, a carbonyl group, a sulfonyl group, an amino group, a hydroxy group, or a heterocycle group; and when n is an integer of two or more, each $R_9$ may be the same or different, and each $R_9$ may be combined to form a condensed ring.

5. The method of claim 4, wherein the display element satisfies Condition (1):

$0 \leq [X]/[Ag] \leq 0.01$  Condition (1)

wherein:

[X] (mole/kg) represents a molar content of halogen ions or halogen atoms comprised in the electrolyte layer; and

[Ag] (mole/kg) represents a total molar content of the silver or silver contained in the compound comprising silver in the chemical structure, comprised in the electrolyte layer.

6. The method of claim 4, wherein the driving operation comprises an operation to deposit blackened silver at a potential higher than an overpotential and an operation to continue depositing the blackened silver at a potential lower than the overpotential.

* * * * *